March 22, 1960 E. G. PAQUETTE 2,929,355
PRESSURE OPERATED GUN TYPE LIQUID FEED DEVICE
Filed Jan. 4, 1955 4 Sheets-Sheet 1

INVENTOR.
ELMER G. PAQUETTE
BY
*Attorney*

March 22, 1960 E. G. PAQUETTE 2,929,355
PRESSURE OPERATED GUN TYPE LIQUID FEED DEVICE
Filed Jan. 4, 1955 4 Sheets-Sheet 2
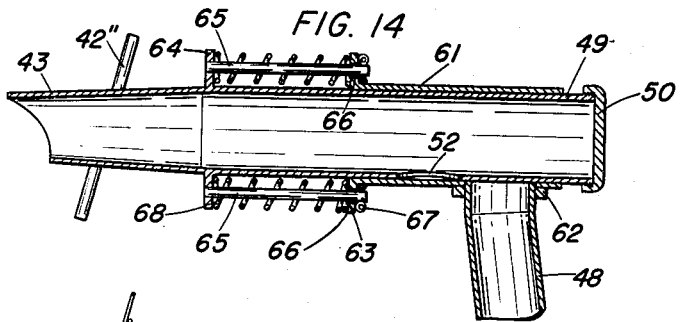
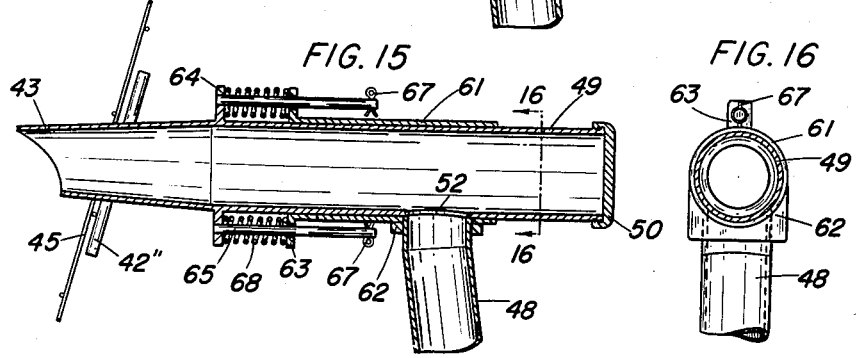
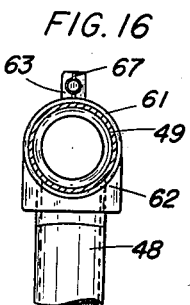
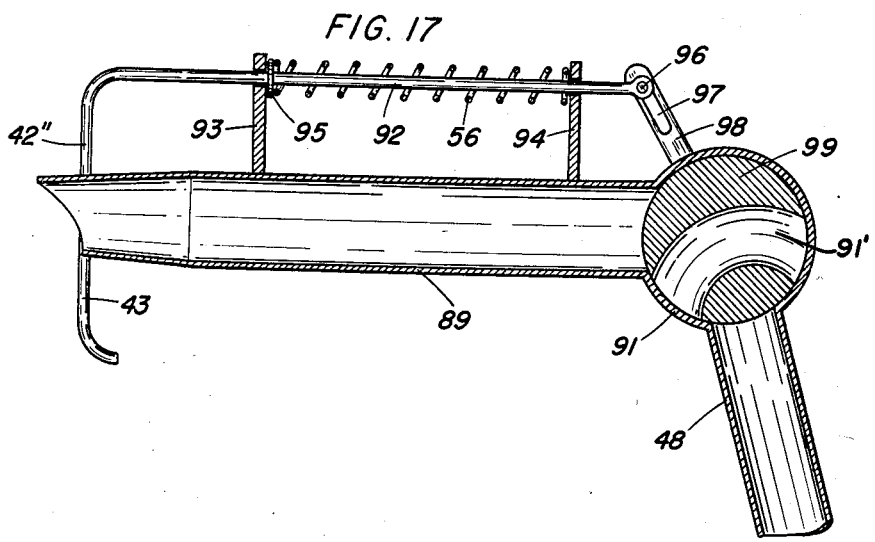
INVENTOR.
ELMER G. PAQUETTE
BY
Attorney

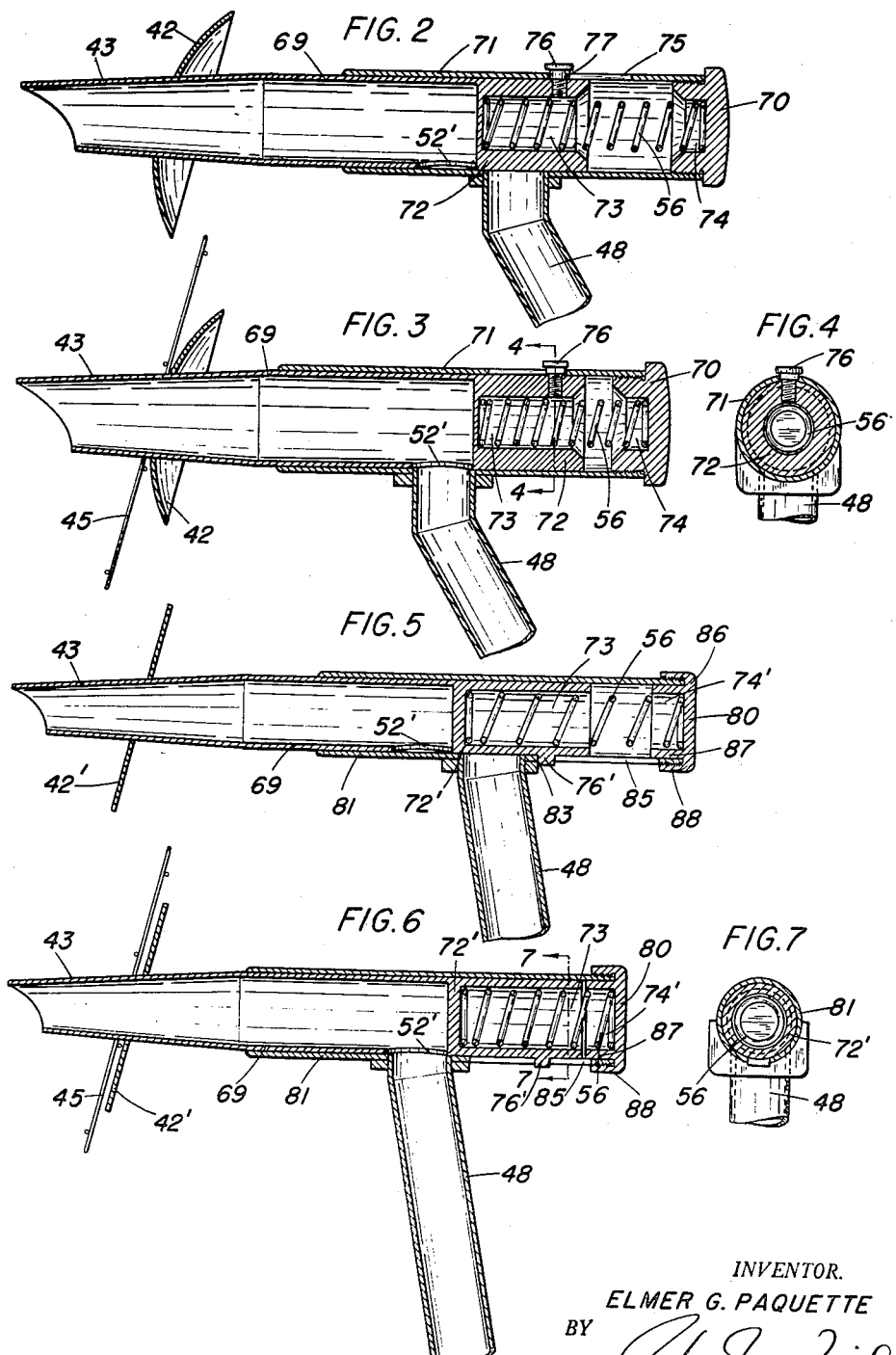

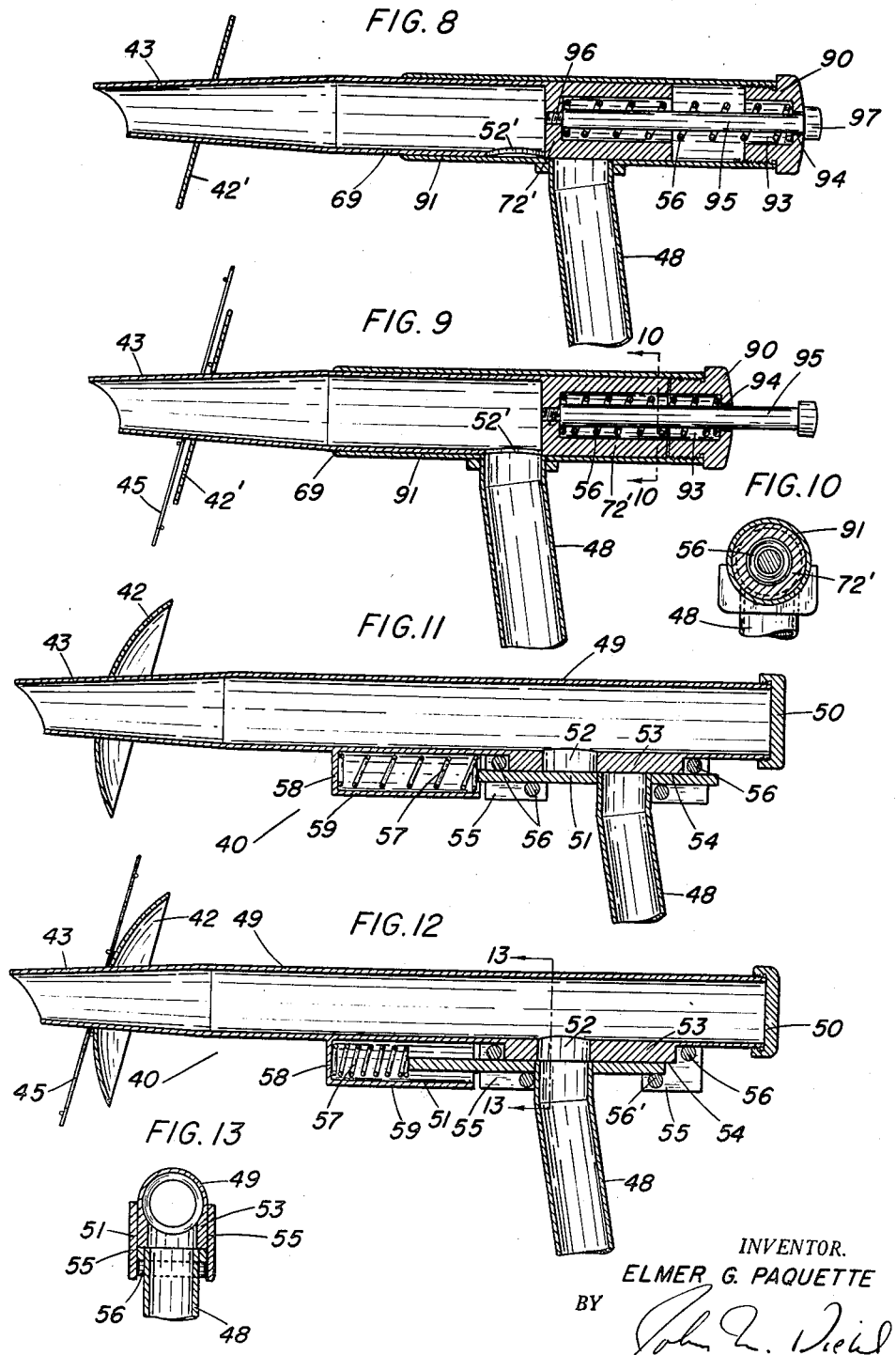

United States Patent Office 2,929,355
Patented Mar. 22, 1960

2,929,355

PRESSURE OPERATED GUN TYPE LIQUID FEED DEVICE

Elmer G. Paquette, Cambridge, Wis.

Application January 4, 1955, Serial No. 479,742

1 Claim. (Cl. 119—51)

This invention relates to a device for feeding animals and more particularly to apparatus for introducing mink feed into troughs contained in mink cages under power without opening the cages.

The raising and care of animals is attended with many requirements which must be met as a minimum in order to make certain that the animals are healthy and that they grow and develop at a suitable rate. Perhaps the most basic of these requirements is that the animals be provided with water and food; many difficulties may be involved in even such a relatively simple operation. Most of the difficulties which may be encountered with any type of animal are usually accentuated in the case of mink. Mink are noted for their mean, viscious disposition and at the same time are sensitive to many things which are of little importance in connection with other animals. It is more important than with other animals that their food be clean and uncontaminated (it is mink who in the wild state always wash food before it is eaten, even fish). They are sensitive to unaccustomed noises or interruptions particularly during the period when their offspring are extremely small.

The difficulties of raising and feeding mink are increased by the fact that it is economically desirable to maintain a relatively large number of mink as a minimum. Mink are usually kept in long strings of sheltered or open cages. The fronts of these cages are usually covered with wire netting and often tops, sides and bottoms are so covered. The usual method of feeding mink is for an individual to carry open pails of the food down the aisleway between rows of cages, stopping at each cage and ladling, dipping, squirting or pouring a portion of the food into a trough or other receptacle contained in each of the cages. It is usually necessary for the individual to open a door in each of the cages and the operation of unlatching the door, opening it, introducing food into the trough, closing the door and relatching it is relatively time-consuming when it is necessary to feed a very large number of animals. The operation is relatively unsanitary in that food is carried in open containers under all sorts of conditions including those of quite hot summer weather when many flies are usually present. Although many modifications of this basic system may have been used heretofore it is generally true of all such previous feeding methods that they have been awkward, wasteful, tiring to individuals doing the feeding, time-consuming and in some cases unsanitary.

In feeding some animals food is transferred in portable containers to troughs within the cages or animal-containing enclosures. This, of course, is only possible where the portable container and the person or apparatus carrying the container can be contained within the enclosure, together with the animals, and obviates none of the difficulties attendant in feeding animals in the previously described manners. It is of course entirely unsuitable for use with mink which are normally contained in relatively small cages and which are well known for a propensity to attack human beings who enter enclosures in which they are contained. For example, even in feeding mink from outside their cages, it has generally been necessary for the individual doing the feeding to wear gloves. These constitute of course only a relatively minor encumbrance but are indicative of the many precautionary steps which must be taken in feeding mink.

The aforementioned difficulties and many others are obviated or eliminated by the apparatus of my invention in which mink food, after being prepared in a preparation area, is transported to a feeding area and there introduced into mink cages from a single portable main feed supply source. In a preferred embodiment I provide a wheel or track-mounted vehicle, which may be self-powered, and mounted thereon a tank and an air-compressor and suitable fittings to accommodate the tank to being filled with mink feed, to allow it to be sealed substantially hermetically, to introduce air-pressure thereinto by means of said compressor and to deliver food therefrom through openings at or near the bottom of said tank. Connected to one or more such openings may be one or more flexible hoses or tubes, each provided at its output end with a nozzle and valve, the valve being adapted to be opened by placing the nozzle against the wire of a mink cage.

It is therefore an object of the invention to provide a device for feeding mink wherein food is delivered by power to the interior of mink cages directly from the container in which it is placed after preparation, without intervening transfer of the food from one container to another and without opening of the cages.

Another object is an apparatus for feeding mink wherein food is delivered directly to the interior of the cages under power from a portable container with a minimum of motions and steps by the operator.

Another object is such means for delivering food to the interior of mink cages wherein no gesture is necessary by the operator to deliver such food except that of introducing a nozzle within the cage.

Further objects will become apparent from the drawings and the following detailed description in which it is my intention to illustrate the applicability of the invention without thereby limiting its scope to less than that of all those equivalents which will be apparent to one skilled in the art. In the figures, like reference numerals refer to like parts and:

Figure 2 is a longitudinal cross-sectional view of the feeding gun of Figure 3, taken on a vertical median plane of same, the gun being in the closed position;

Figure 3 is a longitudinal cross-sectional view of the gun of Figure 2 in the open position;

Figure 4 is a cross-sectional view taken on lines 4—4 in Figure 3;

Figure 5 is a longitudinal cross-sectional view of another embodiment of the gun in the closed position, taken on a vertical median plane thru Figure 6;

Figure 6 is a longitudinal cross-sectional view of the gun of Figure 5 in the open position;

Figure 7 is a cross sectional view taken on lines 7—7 in Figure 5;

Figure 8 is a longitudinal cross-sectional view of another embodiment of a feeding gun in a closed position, taken on a vertical median plane thru Figure 9;

Figure 9 is a longitudinal cross-sectional view of the gun of Figure 8 in the open position;

Figure 10 is a cross-sectional view taken on lines 10—10 in Figure 8;

Figure 11 is a longitudinal cross-sectional view of another embodiment of the feeding gun in the closed position;

Figure 12 is a longitudinal cross-sectional view of the gun of Figure 11 in the open position;

Figure 13 is a cross-sectional view taken on lines 13—13 in Figure 11;

Figure 14 is a longitudinal cross-sectional view taken as in Figure 15 of another embodiment of a feeding gun according to the invention, in the closed position;

Figure 15 is a longitudinal cross-sectional view of the gun of Figure 14 in the open position;

Figure 16 is a cross-sectional view taken on lines 16—16 in Figure 14;

Figure 17 is a longitudinal cross-sectional view of a feeding gun taken on a plane passing through the axis thereof.

Figure 1:
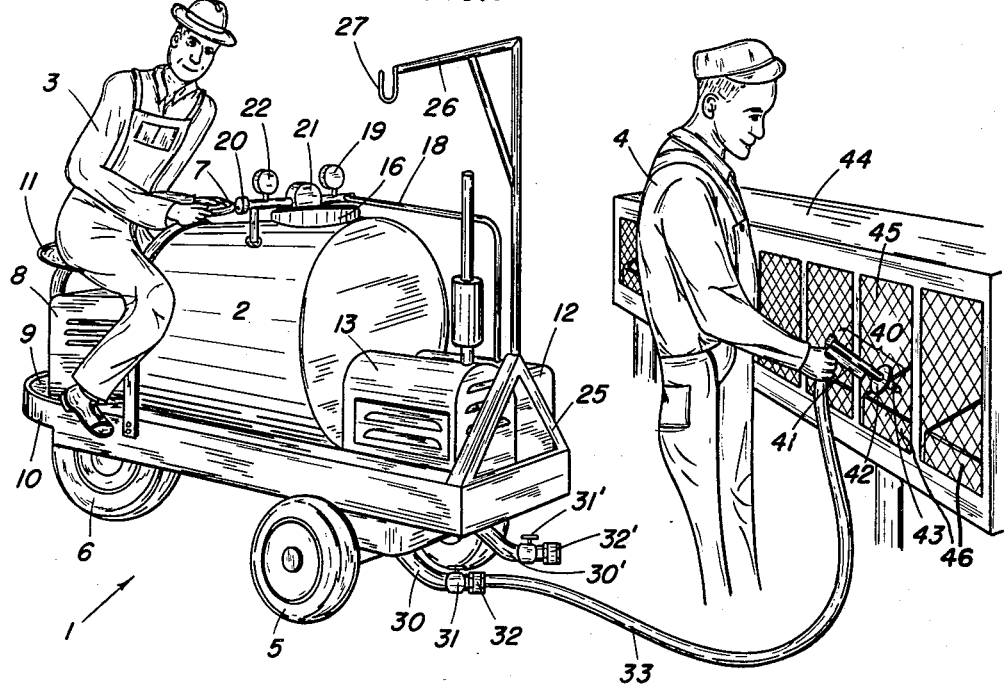
Figure 1 is a perspective view of the apparatus of the invention.

The device of my invention is thus a device for feeding mink on large farms where a very large number of mink have to be fed at least twice a day and time is of the essence in carrying out the feeding operation. Mink are kept in wire cages and in order to feed the mink a very heavy slurry of feed is injected through the wire of the cake into a pan within the cage by any one of several means.

Heretofore it has been well known to use devices for this purpose which correspond to the well-known grease gun used for greasing automobiles. It has not been possible heretofore to provide power operated mink feeding apparatus for the reason that the feed for mink contains bone chips, long stringy sections of tendon and the like and also large chunks of meat. Raisers of mink in the southern Wisconsin area have invested relatively large sums of money, believed to be as much as $100,000 collectively, in attempts to develop apparatus for power feeding of mink without success. Both diaphragm pumps and centrifugal pumps have proved unsatisfactory. The use of a diaphragm pump for mink feeding has resulted in the rupture of the diaphragm by pieces of bone and the like. The material is too heavy to go through a centrifugal pump. It fouls up or clogs the valves in piston pumps and likewise the valves in ordinary types of the aforementioned devices corresponding to grease guns.

The device of my invention makes unnecessary a separate valve to control flow of feed and provides for powered pushing or delivery of feed through the device when its nozzle is inserted in the mink's cage. The use of a slide valve at the nozzle has overcome difficulties with clogging or fouling of valves which were encountered with the aforementioned devices and the absence of all other interruptions to the flow of feed in the feed-line has resulted in an exceptionally satisfactory working apparatus.

It may be noted additionally that an advantage of the device is that it may readily be taken apart and readily cleaned, which, in any food handling or food product-handling device, is highly advantageous since such apparatus must always be cleaned after each using.

At the present time, on one farm where my device is in use, two men working as a team are feeding in one hour 2400 mink, which corresponds to a rate of feeding of 1200 mink per hour per man. On another farm, with the use of a three-man team and two feeding nozzles, 4800 mink are being fed per hour which corresponds to a rate of feeding of 1600 mink per hour per man. The rate of feeding mink with the devices of the prior art is on the order of 400 to 500 mink per man-hour.

Referring now to Figure 1 there is shown a self-powered vehicle indicated generally as 1 which carries tank 2 and may be driven by operator 3, who may be part of a two-man team of which operator 4 is the other member. The vehicle is shown provided with wheels 5 and may be self powered but it is conceivable that an outside power source may be utilized. As shown, the rear wheels 6 may be steerable by means of steering wheel 7 and may be powered by the motor 8, mounted on fifth wheel 9. Fifth wheel 9 may be rotatably mounted within frame 10. Over motor 8 there may be provided a seat 11, attached to frame 10, for the use of operator 3. Also mounted on frame 10 there may be provided compressor 12 driven by motor 13. Agitation or stirring of feed contained within tank 2 in some cases is not necessary and for the sake of simplicity such apparatus is not shown. Tank 2 may be provided with manhole 16 through which feed may be introduced into the interior of tank 2 and through which an operator may have access to the interior of the tank in order to accomplish its thorough and rapid cleansing. Air may be introduced from compressor 12 into the upper portion of tank 2 through line 18. Tank 2 may be provided with pressure gauge 19, air-relief valve 20, pressure regulator 21 and pressure gauge 22, which respectively may be adapted to indicate to the operator the pressure in line 18, to vent tank 2 and line 18 to the atmosphere if pressure therewithin becomes higher than may be safely permitted, to regulate the air-pressure within tank 2 and to indicate to the operator the pressure of the air within tank 2, respectively. Also attached to frame 10 there may be provided a base 25 for a crane and a swinging crane boom 26 mounted therein and provided at its outermost end with a hook 27 to facilitate the feeding operation as more fully described hereinafter. At the bottom of tank 2 there may be provided outlets leading to feed-lines 30 and 30' which may be provided with valves 31 and 31' and with couplers 32 and 32'. Valves 31 and 31' may be of the type which can be quickly disassembled for cleaning without the use of tools and couplers 32 and 32' may be of any suitable type which may be coupled and uncoupled quickly without the use of tools, generally with no more than a quarter or half turn of the coupling members. Attached to coupling 32 there may be provided a lightweight flexible food-carrying hose 33, provided at its other end with the nozzle and valve device indicated generally as 40 and referred to hereinafter as a gun or feeding gun.

Gun 40 may be provided with valve 41 adapted to be opened by light pressure of the mink cage wire against wire interrupting member 42 on nozzle 43.

To operate the apparatus the tank is first filled with food. Such food may be a semi-solid mixture of ground meat, tripe, cereal, meat, wheat germ concentrate, water, bone chips, and the like. Manhole 16 may be closed by any suitable means. For example, the manhole cover may be held in place inside tank 2 and bearing upwardly against the downwardly projecting flange at the rim of the manhole. The compressor engine may then be started and as pressure is built up in tank 2 the manhole cover is seated against the flange thereby effectively closing and sealing manhole 16. The pressure may be increased to that necessary to deliver food through hose 33 while operator 3 drives vehicle 1 to the area where mink cages 44 are located. Safety valve 20 may be set to operate at 100 to 125 pounds per square inch and regulator 21 may be set to provide a pressure of 35 to 80 pounds per square inch within tank 2. Operator 4 may then hook hose 33 on hook 27 in order to avoid the necessity of supporting all of its weight himself and may then insert nozzle 43 of gun 40 between the wires of wire mesh 45 whereupon the wires thereof act against wire-engaging member 42 and open valve 41 allowing food to flow out of nozzle 43 into pan 46 contained in each of cages 44. As the gun is withdrawn from each of the cages the wires of wire mesh 45 cease to press against member 42 and valve 41 is closed by a spring as described more fully hereinafter. After all of the mink have been fed or after tank 2 has become empty of feed, a decompression valve, which for the sake of simplicity is not shown, is opened and motor 13 is shut off so that compressor 12 ceases to operate. Air then escapes from the interior of tank 2 whereupon manhole 16 may be opened and additional food may be inserted therein or the equipment may be disassembled and cleansed.

Although one man can operate the device, it is obvious that greatest efficiency is obtained with a team of at least two men wherein one member of the team operates device 1 and one member of the team operates gun 40. A hose such as hose 33 may be connected to coupler 32' and may be provided with a gun at its end so that two men may feed mink in cages on both sides of the aisle simultaneously. The speed of the operation may thus be doubled.

As shown in Figures 11 to 13 the gun indicated generally as 40 may comprise hollow handle portion 48 which is connected to one end of hose 33 (Figure 1) and barrel 49. Barrel 49 may be provided at that one of its ends which is most remote from handle portion 48 with a nozzle 43 and cage wire resisting member 42. At its other end it may be provided with a closure 50 which may be attached thereto by any suitable means, for example, by threads as shown. Hollow handle portion 48 may be provided at its upper end with flat plate 51 substantially located in a plane normal to the axis of tube 48. Barrel 49 may be provided in one side thereof with aperture or opening 52 and opening 52 may be surrounded with a boss 53 having on its lower side a flat surface 54 adapted to slidably engage the upper flat surface of plate 51. Boss 53 may be provided with flat sides and there may be attached thereto and on each side thereof flat downwardly extending plates 55. Extending transversely underneath barrel 49 there may be provided a plurality of small rollers 56, mounted with each end rotatably extending into holes in plates 55 in such manner that they engage both the upper and lower surfaces of plate 51 on both sides of handle portion 48. Barrel 49 is thereby retained in slidable engagement with the top of tube 48 and as shown in Figure 11, when gun 40 is not in use the top of tube 48 is closed by a portion of the upper surface of plate 51 extending thereacross. Spring 57 may be provided below barrel 49 being engaged at one end with that end of plate 51 nearest nozzle 43 and at the other end by plate 58 projecting downwardly from the bottom of barrel 49. Spring 57 may, if desired, be enclosed and protected by means of housing 59 extending therearound. When with a light poking pressure nozzle 43 is pushed between the wires of wire mesh 45 as shown in Figure 12 the wire mesh engaging member 42 encounters wire mesh 45 and transmits a longitudinal force to barrel 49 which causes the barrel to slide along plate 51 thus compressing spring 57. Opening 52 is thereby caused to register with the opening at the top of tube 48 and food may then flow upward through member 48, thence through barrel 49 and nozzle 43 and into the interior of the mink's cage. When gun 40 is withdrawn from wire mesh 45 the force of spring 57 against plate 58 causes barrel 49 to move back into a closed position with respect to tube 48 as shown in Figure 11, thereby stopping the flow of food.

Gun 40 may be easily disassembled for cleaning by removing roller 56' which may be adapted to be easily removed from between plates 55 and also by removing end cap 50.

Referring now to Figures 14 and 16 there is shown another embodiment wherein the top of tube 48 is attached to sleeve 61, which surrounds and slidably engages the outer surface of barrel 49. Sleeve 61 is provided with an opening at the point where it joins tube 48 so that the passageway within tube 48 is not obstructed thereby. The point of juncture may if desired be provided with reinforcing member 62 which may be soldered or welded thereto. At the end of sleeve 61 nearest nozzle 43 there may be provided upwardly and downwardly projecting lugs 63 attached thereto as by any common expedient. A flange may be used in place of the lugs, if desired. Barrel 49 is also provided with upwardly and downwardly extending lugs 64 which may be similar in length and size to lugs 63 and may be attached to barrel 49 by any suitable means such as welding or soldering. Attached to each of lugs 64 there may be provided a rod 65 securely attached thereto and projecting (parallel to the axis of barrel 49) toward the end of barrel 49 closed with cap 50. Rods 65 may extend through holes 66 provided in lugs 63 and may be provided at their other ends with retaining means 67 which may be cotter keys as shown. Surrounding rods 65 and interposed between lugs 63 and 64 there may be provided small helical compression springs 68. When the gun remains in the undisturbed position as shown in Figure 14, opening 52 in barrel 49 is closed by a portion of sleeve 61 extending thereacross and the upper end of tube 48 is closed by a portion of barrel 49 extending thereacross. However when nozzle 43 is extended with a light poking pressure through wire mesh 45 as shown in Figure 15, wires thereof engage the wire engaging member 42'' and force barrel 49 backward against the light pressure of spring 68, causing opening 52 to register with the top of tube 48 and thereby allowing food to flow upward through tubular handle 48, thence through barrel 49 and thence out nozzle 43 into a trough contained within the mink cage behind mesh 45. Springs 68 are thereby compressed. When the gun is then withdrawn from mesh 45 the force of springs 68 acting between lugs 63 and 64 causes barrel 49 to again move into the relationship with respect to tube 48 which is shown in Figure 14. The gun of Figures 14 to 16 may be easily disassembled by removing cotter pins 57 from the ends of rods 65, then removing end cap 50 and withdrawing barrel 49 from within sleeve 61.

Referring now to Figures 2 to 4 there is shown another embodiment wherein barrel 69 is provided with nozzle 43 and mesh engaging member 42 at one end and with opening 52' in one wall thereof and wherein tube 48 is provided with sleeve 71 slidingly engaging the outer surface of barrel 69 and having an opening therein and attached at said opening to the upper end of tube 48 in such manner as to avoid obstruction of the passageway within tube 48. Barrel 69 is closed at its end most remote from nozzle 43 by cylindrical block 72 provided with a recess 73 therein adapted to receive one end of spring 56. Sleeve 71 is provided with a removable closure such as screw plug 70 at its end most remote from nozzle 43 and plug 70 is provided with a recess 74 adapted to receive the other end of spring 56. Sleeve 61 is provided with a longitudinal slot 75 in its upper portion. Attached to the upper portion of cylindrical block 72 there may be provided screw 76 provided with a shank 77 which may have a diameter only slightly less than the width of slot 75 and may thereby be adapted to slidably engage the sides of slot 75 and thereby prevent barrel 69 from rotating and at the same time control the extent to which barrel 69 may slide longitudinally in either direction within sleeve 71. When the gun is at rest as shown in Figure 2, opening 52' in barrel 69 is closed by a portion of sleeve 71 extending thereacross and the upper end of tube 48 is closed by a portion of the outer surface of block 72, which is an extension of the outer surface of barrel 69, extending thereacross. When nozzle 43 is extended between the wires of wire mesh 45 with a light poking pressure as shown in Figure 3, the wires of mesh 45 engage member 42 and exert a longitudinal backward force on barrel 69 thus compressing spring 56 and bringing opening 52' into engagement with the upper end of tube 48. Thus feed under pressure may travel upward through tube 48, thence through the interior of barrel 69 and thence out of nozzle 43 into a trough contained in the mink cage behind mesh 45. When the gun is withdrawn the compressive force of spring 56 causes barrel 69 to again assume the position with relation to tube 48 and sleeve 71 which is shown in Figure 2 thus shutting off the flow of feed. The gun may be easily disassembled for cleaning by removing screw 76 and withdrawing barrel 69 and spring 56 from within sleeve 71. To facilitate cleansing, closure 70 may be removed.

As shown in Figures 5 to 7, barrel 69 may be provided with a nozzle 43 and a closure 72', having recess 73 therein adapted to receive an end of spring 56, and tube 48 may be provided with a sleeve 81 attached to its upper end in a manner similar to that in which sleeve 71 or sleeve 61 is attached. Nozzle 43 may be provided with a wire mesh engaging member 42' which may consist of a washer easily removable therefrom, which may at the same time be readily held firmly engaged therewith by reason of frictional engagement with the slightly tapering outer surface thereof. Sleeve 81 may be provided with easily removable closure 80 at its end most remote from nozzle 43, and closure 80 may be provided with recess 74' therein adapted to receive an end of spring 56. Sleeve 81 may be provided with a slot 85 in the bottom portion thereof extending entirely to the end thereof which is closed by closure 80. Closure 80 may consist of a cap portion 86, a cylindrical portion 87 defining, together with portion 86, recess 74' and frictionally engaging at its outer surface, the internal surface of sleeve 81 and an internally threaded portion 88 extending from the outer marginal edge of cap portion 86 along the outer surface of sleeve 81. Together portions 87 and 88 may be adapted to maintain the cylindrical form of and prevent deformation of that end of sleeve 81 which is closed by closure 80. Such deformation might result from weakening thereof by the extension of slot 85 entirely to the end of sleeve 81. Plug 72' may be provided with projection 76' which may slidably engage the sides of slot 85. When the gun is at rest, undisturbed, the parts may have the relationship shown in Figure 5 wherein opening 52' in barrel 69 is closed by a portion of sleeve 81 extending thereacross and the top of tube 48 is closed by the extension thereacross of a portion of the outer cylindrical surface of plug 72' which is effectively an extension of the outer cylindrical surface of barrel 69. When the gun is inserted with a light poking pressure through wire mesh 45 as shown in Figure 6, the wires of mesh 45 engage member 42' and therethrough longitudinal force is exerted on barrel 69 causing it to slide within sleeve 81 until further sliding is prevented by the abutting of plug 72' against portion 87 of closure 80 and at the same time to act against the force of spring 56 causing this spring to be compressed. In this position, opening 52' is aligned with the upper end of tube 48 and feed may flow upward through tube 48, thence through the interior of barrel 69 and thence out nozzle 43 into a trough contained in a mink cage behind wire mesh 40. When a suitable amount of feed has passed through nozzle 43 the gun may thereupon be withdrawn. The compressive force of spring 56 then causes the parts to reassume the relation shown in Figure 5 with resulting cessation of the flow of feed. The extent to which barrel 69 can slide in the direction in which it is forced by spring 56 is determined by the location of projection 76' when engaged with that portion of sleeve 81 adjacent the upper end of tube 48 as shown at 83. The gun may be easily and quickly disassembled for cleansing by removing member 42' from nozzle 43, removing closure 80 and withdrawing barrel 69 from within sleeve 81. Because slot 85 extends entirely to the end of sleeve 81, it is unnecessary to carry out any step comparable to the step of removing screw 76 which is necessary with the embodiment shown in Figures 2 to 4; projection 76' slides out of slot 85 when barrel 69 is withdrawn.

Referring now to Figures 8 to 10 there is shown another embodiment wherein barrel 69 is provided at one end with nozzle 43 and member 42' and at the other end with plug 72', and tubular handle 48 is provided with a sleeve 91 attached to the upper end thereof in a manner similar to that in which sleeves 81, 71 and 61 are attached. Plug 72' is provided with a recess therein adapted to receive an end of spring 56. Screw plug 90 which may constitute an enclosure for the end of sleeve 91 most remote from nozzle 43 is provided with a recess 93 therein adapted to receive the other end of spring 56. A hole 94 may be provided in closure plug 90 and a headed bolt 95 may be provided extending through hole 94 and through the inside of spring 56. It may be securely attached to plug 72', for example by being threaded thereinto at 96 as shown, and may be provided at its other end with head 97 adapted to engage the outer surface of closure 90.

When the gun is at rest, as shown in Figure 8, opening 52' is closed by sleeve 91 and the top of tube 48 is closed by plug 72' in the manner hereinbefore described. When nozzle 43 is inserted through wire mesh 45 with a light poking pressure as previously described, the wires of mesh 45, engaging member 42', cause barrel 69 to slide within sleeve 91, compressing spring 56 and causing bolt 95 to extend outwardly beyond closure 90 as shown in Figure 9. Opening 52' is thus brought into registration with the upper end of tube 48 and food may flow under pressure through tube 48, thence through the interior of barrel 69 and thence through nozzle 43 into a trough contained in a cage behind mesh 45. When the gun is withdrawn the force of spring 56 causes the parts to resume the positions shown in Figure 8, thus stopping the flow of feed. Further sliding of barrel 69 within sleeve 91, in the direction in which it is urged by spring 56, is prevented by the engagement of head 97 against the outer surface of closure 90. The device of this embodiment may be easily disassembled by withdrawing member 42' from the outer surface of nozzle 43 and by then removing closure 90 whereupon barrel 69, together with pin 95 and closure 90 may be drawn from within sleeve 91, with nozzle 43 passing therethrough.

Referring now to Figure 17 there is shown another embodiment of a gun wherein barrel 89 is provided with nozzle 43 and the upper end of tube 48 and the end of barrel 89 most remote from nozzle 43 are attached respectively to the inlet and outlet ports of a lubricated plug valve 91. Wire mesh engaging member 42" may extend entirely around nozzle 43 or partly therearound as shown and may consist of a bent wire formed as a continuation of a straight wire 92. Straight wire 92 may be supported in place above barrel 89 and parallel to the axis thereof by passing through holes in lugs 93 and 94 which may be securely attached as by soldering or welding to barrel 89 and may extend upward therefrom. Between lugs 93 and 94 there may be provided washer 95 securely attached to wire 92. Spring 56 may be supported between washer 95 and lug 94. The end of wire 92, at its end most remote from member 42" may be provided with transverse pin 96 extending into and engaging operating slot 97 contained in lever 98 which may be operatively connected with plug 99 in valve 91. The insertion of nozzle 43 between the wire mesh of a cage in the manner hereinbefore described may cause the wires of such mesh to engage member 42" and as member 42" is forced longitudinally backward with respect to barrel 89 the engagement of pin 96 with slot 97 causes lever 98 to open valve 91 so that feed may be forced upward through tube 48 and thence through passageway 91' in valve 91, barrel 89 and nozzle 43 into a trough contained in a mink cage. When the gun is withdrawn the pressure exerted by spring 56 causes the parts to resume the positions shown in Figure 17, thus shutting off the flow of feed. The device shown may easily be disassembled for cleansing by removing pin 96 from its engagement with slot 97 and thereafter removing plug 99 from valve 91 in the manner which is conventional for plug valves used in the food industry for handling milk and like fluids.

Although I have described many of the advantages of the invention, not all of the advantages of the invention have been mentioned and some should be re-emphasized. The invention is advantageous economically in that both time and labor required to feed mink are substantially reduced.

The method of my invention is more sanitary than hand feeding methods of the prior art. Because only one food container is used in carrying out the process of my invention there is far less cleansing to be done after feeding operations are completed than is required when pails and grease-gun-like feeding devices of the prior art are used.

Prior to its introduction into tank 2, the large volume of feed which may be contained therein may be heated or cooled according to the season, i.e., during winter or summer respectively. Since heat flow to or from the large mass is far less than that with a large number of small containers the feed stays nearer a desired temperature over a longer period of time.

With the process and apparatus of my invention there is less danger of contamination of the feed by flies and other insects and by foreign matter of all sorts than is the case with many methods of the prior art.

Although the invention produces great economies in feeding time and labor alone, economies are also realized in the cleansing operation because only one unit rather than a large number of units to be washed and also because the apparatus of the invention can be easily and quickly disassembled with the hands alone and without tools, to accomplish its cleansing.

With methods of the prior art in which a large number of small containers are used, there is nearly always a certain amount of food left on the bottom and sides of each of the containers because food usually used for mink is relatively sticky or tacky. With the apparatus and method of this invention far less food is wasted because although food sticks to the inside walls of the hose and tank, the amount of said surfaces to which food may stick is far less than with a plurality of small containers.

With the invention food wastage is further reduced by comparison with that in methods of the prior art because far less food is spilled on the outsides of cages and in the aisleways than is the case with many methods of the prior art. This is true because food flow cannot occur until the nozzle is inserted within a cage.

Food can be given to the animals with one motion of the operator's hand in place of the several motions required when food is ladled into the cage or inserted therein with a grease-gun-like device.

Another advantage is that there is no chance of an animal escaping because no pen or cage is opened during feeding.

A further advantage is that the apparatus takes far less storage space when not in use and far less operating space when being filled than is the case with a plurality of small units such as are used in methods of the prior art.

An important advantage which cannot be measured directly in terms of the cost of providing animals with feed or in terms of operator comfort is that the ease with which the animals may be fed provides the operators with more time and concomitantly with more inclination to check upon and observe the condition of each animal and each cage and as is well known in the field of animal husbandry, the success which may be obtained in raising animals of all sorts is generally dependent to a considerable extent upon the care and interest shown in each animal by the operator actually engaged in caring for it from day to day.

As with many inventions with which very substantial economies may be achieved and other important advantages realized the invention may appear simple, but it is the very simplicity of the apparatus required and the method for using it to feed animals which produces the numerous advantages described above.

Various embodiments have been described and illustrated herein but it is my intention to include within the scope of the invention those modifications and variations which will be apparent and which it encompasses. Therefore it is my intention that the invention be limited only by the claim.

Having thus disclosed my invention, I claim:

Apparatus for feeding mink comprising a portable tank adapted to contain animal feed and adapted to be sealed substantially gas tight, means for introducing gas under pressure thereinto, a flexible tube connected to and opening into a portion of said tank, gun means attached to said tube, said gun means comprising a nozzle insertable into an animal-containing enclosure, a hollow handle portion attached to said tube, a sleeve attached to said handle portion and provided with an opening in one side communicating directly with the interior of said handle portion, barrel means slidably inserted in said sleeve portion, an opening in one side of said barrel means, at one end of said barrel portion said nozzle attached, at the other end of said barrel portion a removable closure, at one end of said sleeve portion a closure, and spring means extending between said two closures.

References Cited in the file of this patent

UNITED STATES PATENTS

| | | |
|---|---|---|
| 1,700,471 | Davis | Jan. 29, 1929 |
| 1,725,234 | Wedeberg | Aug. 20, 1929 |
| 1,883,280 | Zerk | Oct. 18, 1932 |
| 2,189,213 | MacDonell | Feb. 6, 1940 |
| 2,279,405 | Laughlin | Apr. 14, 1942 |
| 2,362,215 | Morreale | Nov. 7, 1944 |
| 2,578,863 | Trelease | Dec. 18, 1951 |
| 2,603,462 | Brown et al. | July 15, 1952 |
| 2,745,572 | Talbott | May 15, 1956 |